(12) United States Patent
Hammer (10) Patent No.: US 12,472,785 B2
(45) Date of Patent: Nov. 18, 2025

(54) COLLAPSING TOW HOOK ASSEMBLIES AND VEHICLES INCLUDING SAME

(71) Applicant: Toyota Motor Engineering & Manufacturing North America, Inc., Plano, TX (US)

(72) Inventor: Jeremiah T. Hammer, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 497 days.

(21) Appl. No.: 17/986,404

(22) Filed: Nov. 14, 2022

(65) Prior Publication Data

US 2024/0157741 A1    May 16, 2024

(51) Int. Cl.
*B60D 1/42*    (2006.01)
*B60D 1/48*    (2006.01)

(52) U.S. Cl.
CPC ....... *B60D 1/42* (2013.01); *B60D 1/48* (2013.01)

(58) Field of Classification Search
CPC .. B60D 1/243; B60D 1/42; B60D 1/44; B60D 1/46; B60D 1/48; B60D 1/485; B60D 1/488; B60D 1/52; B60D 1/54; B60D 2001/544
See application file for complete search history.

(56) References Cited

U.S. PATENT DOCUMENTS

| | | | |
|---|---|---|---|
| 8,371,602 B1 * | 2/2013 | Peschansky | B60D 1/488 280/495 |
| 10,071,608 B2 | 9/2018 | Numa | |
| 10,131,193 B2 * | 11/2018 | Degenkolb | B60D 1/54 |
| 10,202,260 B2 | 2/2019 | Costa | |
| 2009/0108566 A1 * | 4/2009 | Asjad | B60D 1/488 280/498 |
| 2009/0184493 A1 | 7/2009 | Eifert et al. | |
| 2019/0217673 A1 * | 7/2019 | Shenaq | B60D 1/50 |
| 2022/0332157 A1 * | 10/2022 | Barrios Albert | B60D 1/565 |

FOREIGN PATENT DOCUMENTS

| | | |
|---|---|---|
| CN | 201559491 U | 8/2010 |
| CN | 209365789 U | 9/2019 |
| GB | 605360 A | 7/1948 |

* cited by examiner

*Primary Examiner* — Jacob S. Scott
(74) *Attorney, Agent, or Firm* — Dinsmore & Shohl LLP (57) ABSTRACT

A tow hook assembly including a housing, a receiving member, and a pin. The housing includes a side wall defining an asymmetric opening having a cam surface and an end wall. The pin rotatably couples the receiving member to the housing between an extended position and a rotated position. The pin includes an extended portion received within the asymmetric opening of the housing. In the extended position, the extended portion abuts against the end wall to inhibit rotation of the receiving member with respect to the housing in a first direction. Upon an application of a force exceeding a predetermined threshold, the extended portion abuts and deforms against the cam surface to permit rotation of the receiving member in a second direction opposite the first direction to rotate the receiving member from the extended position towards the rotated position.

20 Claims, 8 Drawing Sheets

COLLAPSING TOW HOOK ASSEMBLIES AND VEHICLES INCLUDING SAME

TECHNICAL FIELD

The present specification generally relates to tow hook assemblies for vehicles and, more specifically, tow hooks assemblies that collapse upon impact with an object during a vehicle front end collision.

BACKGROUND

To tow a vehicle in the event of an accident, malfunction, loss of gas, or being stuck in mud or snow, tow hooks are provided at specific locations of a frame of the vehicle to tow the vehicle without causing damage. Tow hooks are typically mounted on a front rail of the vehicle and may extend through apertures formed in a front bumper of the vehicle to project outwardly therefrom. Alternatively, tow hooks may project from beneath the front bumper or any other suitable location around the vehicle, for example, a rear of the vehicle.

Tow hooks are typically formed from a rigid material to withstand large forces when being towed and to remain secured to the vehicle itself. However, the tow hook is connected to the vehicle in a manner that may damage one or more parts of the vehicle during a front end collision.

Accordingly, a need exists for improved tow hook assembly that reduce damage to parts of a vehicle during a front end collision.

SUMMARY

In one embodiment, a tow hook assembly includes a housing, a receiving member, and a pin. The housing includes a side wall defining an asymmetric opening having a cam surface and an end wall. The pin rotatably couples the receiving member to the housing between an extended position and a rotated position. The pin includes an extended portion received within the asymmetric opening of the housing. In the extended position, the extended portion abuts against the end wall to inhibit rotation of the receiving member with respect to the housing in a first direction. Upon an application of a force exceeding a predetermined threshold, the extended portion abuts and deforms against the cam surface to permit rotation of the receiving member in a second direction opposite the first direction to rotate the receiving member from the extended position towards the rotated position.

In another embodiment, a tow hook assembly includes a housing, a receiving member, a pin, and a frangible member. The housing has a side wall defining a first opening. The pin rotatably couples the receiving member to the housing to rotate in a first direction from an extended position to a rotated position. The frangible member is moveable between an engaged position and a disengaged position. In the engaged position the frangible member couples the receiving member to the housing to inhibit rotation of receiving member from the extended position towards the rotated position. In the disengaged position the frangible member permits rotation of the receiver from the extend position towards the rotated position. Upon an application of a force exceeding a predetermined threshold the frangible member moves from the engaged position to the disengaged position.

In yet another embodiment, a tow hook assembly includes a housing and a receiving member. The housing has a side wall defining an opening and a keyway formed in the opening. The receiving member includes a pair of arms and a key provided at an end of at least one of the arms. The receiving member is positionable between an extended position and a rotated position and the key is received within the keyway when the receiving member is in the extended position. The key is removed from the keyway when the receiving member is in the rotated position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to tow hook assemblies that include a rotatable receiving member, such that the receiving member of the tow hook assembly rotatably pivots during a front end collision. The various components of the tow hook assemblies disclosed herein may be positioned such that a likelihood of potential damage to components of the vehicle, as well as contact with a barrier such as a pedestrian, is reduced during a front end collision. Various embodiments of the tow hook assemblies and operation of the tow hook assemblies are described in more detail herein. Whenever possible, the same reference numerals will be used throughout the drawings to refer to the same or like parts.

Figure 1:
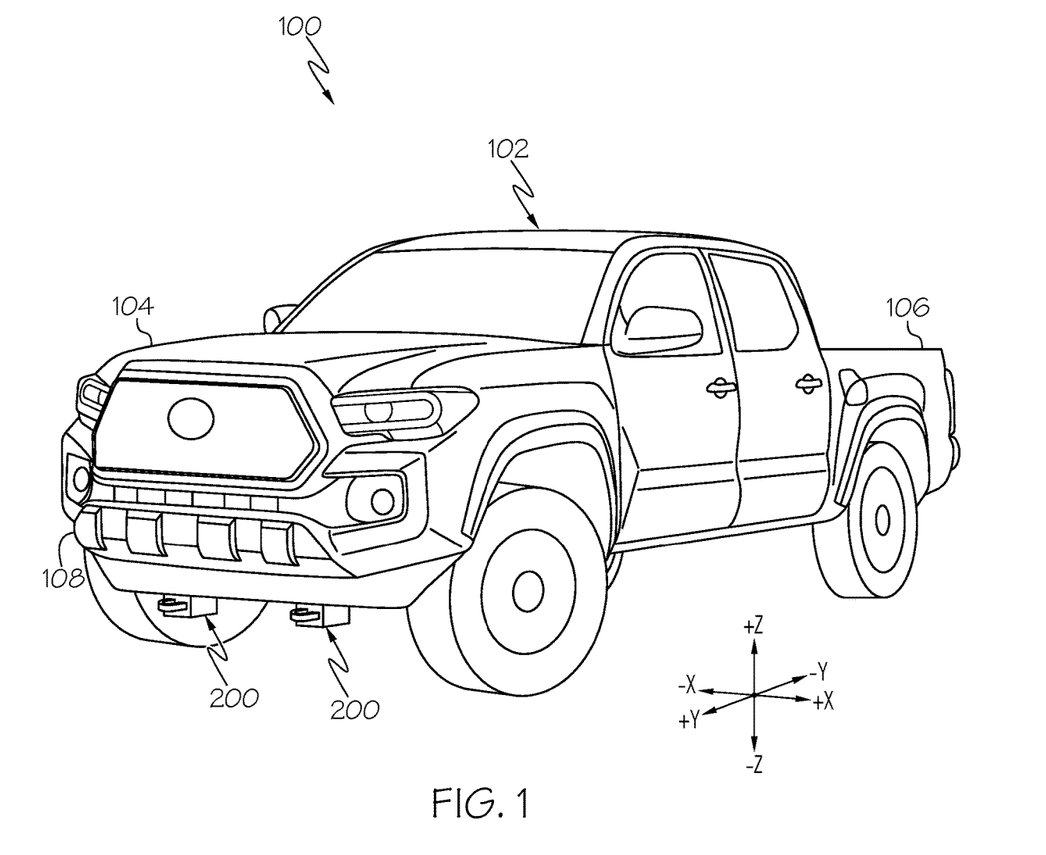
FIG. 1 schematically depicts a perspective view of a vehicle including a pair of tow hook assemblies, according to one or more embodiments shown and described herein.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a vehicle 100 is generally illustrated according to one or more embodiments described herein. As shown, the vehicle 100 is illustrated as a pickup truck. However, the vehicle 100 may be any suitable automobile including coupes, sedans, minivans, crossovers, hybrids, sports utility vehicles, or the like, in addition to other vehicles such as a bus, boat, or the like, without limiting the scope of the present disclosure. The vehicle 100 includes a body 102 having a front end 104, a rear end 106 opposite the front end 104, and a front bumper 108 provided at the front end 104 of the body 102 of the vehicle 100.

The vehicle 100 includes one or more tow hook assemblies 200 located at the front end 104 of the body 102 of the vehicle 100. For example, as depicted herein, the vehicle 100 includes a pair of tow hook assemblies 200 mounted to a cross member of the vehicle 100 as to extend below the front bumper 108 at the front end 104 of the vehicle 100. However, it should be appreciated that the vehicle 100 may include any number of tow hook assemblies 200, such as one tow hook assembly 200 or more than two tow hook assemblies 200. In addition, the tow hook assembly 200 may be mounted at any suitable location of the vehicle 100 such as, for example, though an opening in the front bumper 108, at the front end 104 of the vehicle 100, or to a cross member of the vehicle 100 located in a rearward vehicle longitudinal direction of the front bumper 108.

Figure 2:
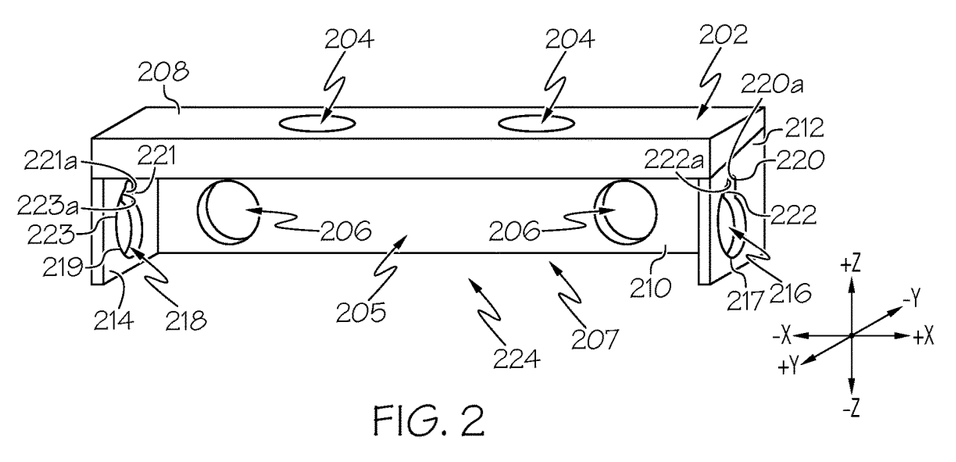
FIG. 2 schematically depicts a perspective view of a housing of one of the tow hook assemblies of FIG. 1, according to one or more embodiments shown and described herein.
Figure 3:
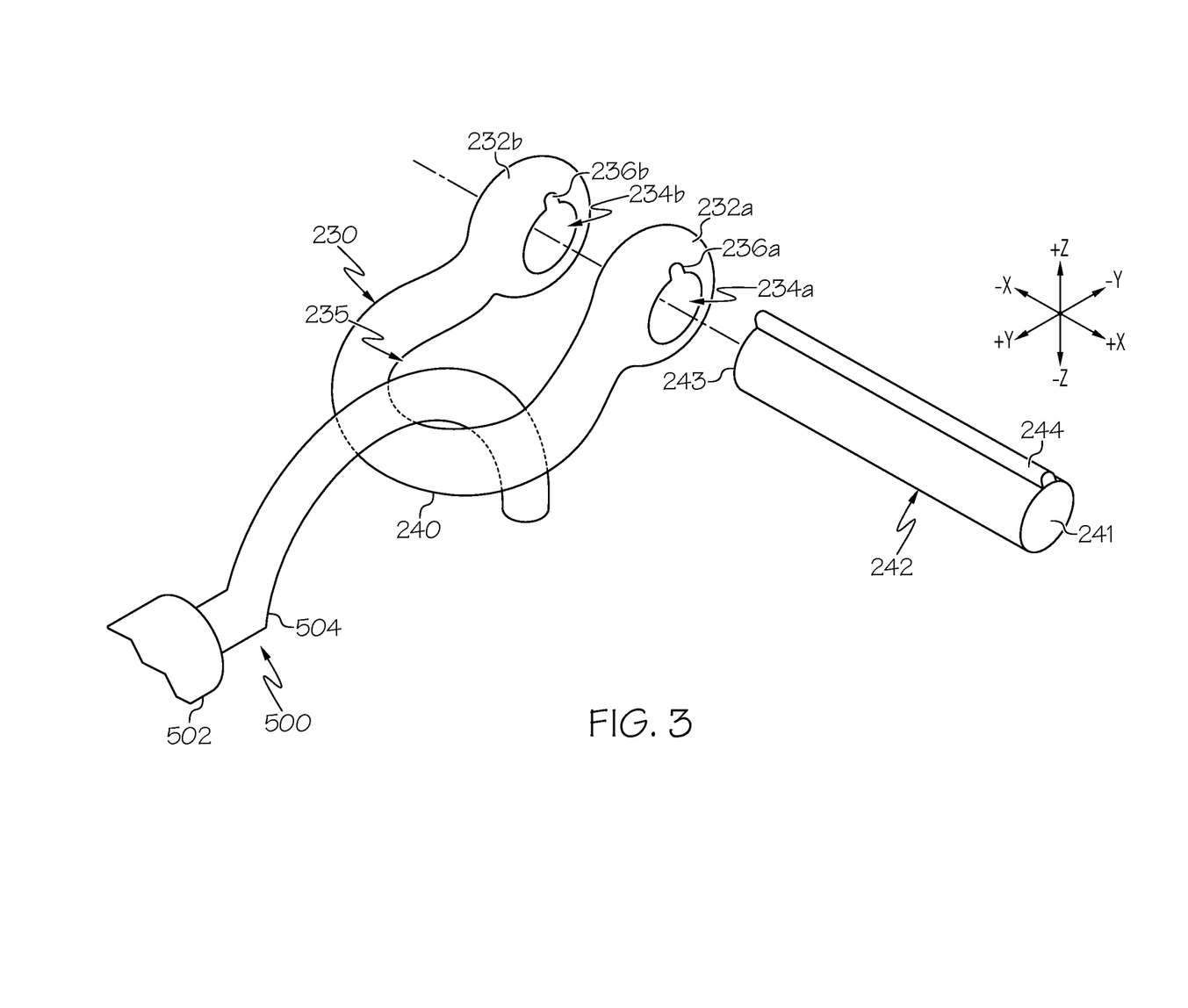
FIG. 3 schematically depicts a perspective view of a receiving member and a pin of one of the tow hook assemblies of FIG. 1, according to one or more embodiments shown and described herein.

Referring now to FIG. 2, a perspective view of a housing 202 of one of the tow hook assemblies 200 of FIG. 1 is shown. As described in greater detail below, the tow hook assembly 200 includes a housing 202, receiving member 230 (FIG. 3), and pin 242 (FIG. 3). The housing 202 includes a top wall 208, a rear wall 210 extending from the top wall 208, a first side wall 212 extending from the top wall 208, and a second side wall 214 extending from the top wall 208 opposite the first side wall 212. The first side wall 212 and/or the second side wall 214 of the housing 202 is formed of a first material having a first stiffness. The top wall 208, the first side wall 212, and the second side wall 214 cooperate to define an open interior 224. The housing 202 has an open front portion 205 located between the first side wall 212 and the second side wall 214, adjacent to the top wall 208 and opposite the rear wall 210.

Figure 4:
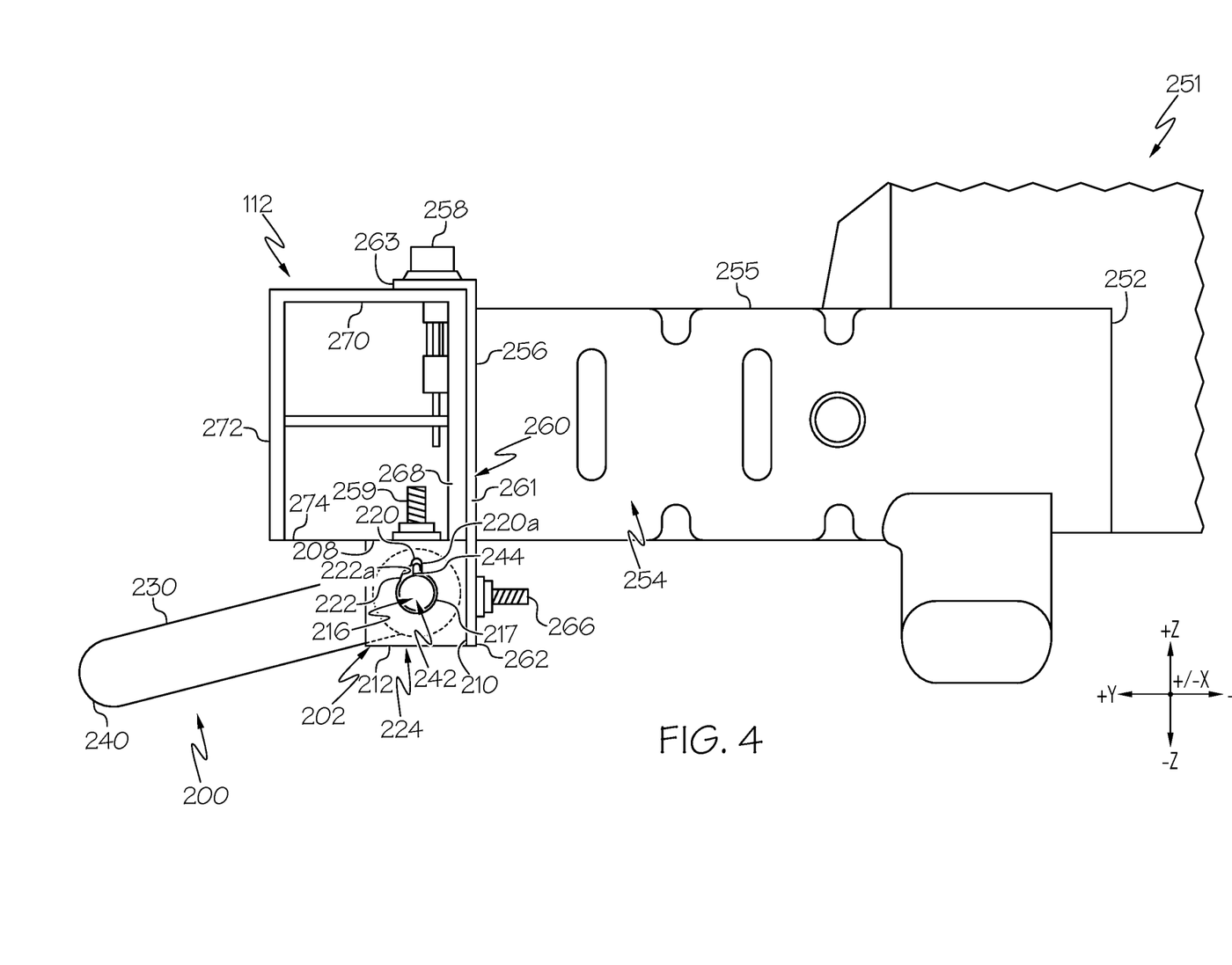
FIG. 4 schematically depicts a side view of one of the tow hook assemblies of FIG. 1 coupled to an upper wall of a from bumper of the vehicle of FIG. 1, according to one or more embodiments shown and described herein.

The housing 202 further has an open bottom portion 207 located between the first side wall 212 and the second side wall 214, adjacent to the rear wall 210 and opposite the top wall 208. In embodiments, the top wall 208 tapers from open front portion 205 to the rear wall 210. As such, a thickness of the top wall 208 extending in the vehicle vertical direction is greater at the open front portion 205 than a thickness of the top wall 208 at the rear wall 210. In embodiments, one or more apertures 204 are formed in the top wall 208 of the housing 202 through which a fastener 259 (FIG. 4) may extend to couple the top wall 208 of the housing 202 to a cross member or bumper reinforcement 112 of the front bumper 108 of the vehicle 100, as shown in FIG. 4. As shown in FIG. 2, a pair of apertures 204 are formed in the top wall 208 of the housing 202 and a fastener 259 may extend through each aperture 204. In embodiments, one or more apertures 206 may be formed in the rear wall 210 through which a fastener 266 (FIG. 4) may extend through to secure the housing 202 to the vehicle 100, as shown in FIG. 4. As shown in FIG. 2, a pair of apertures 206 are formed in the rear wall 210 of the housing 202 and a fastener 266 may extend through each aperture 206.

The first side wall 212 includes an asymmetric opening 216 that a pin 242 (FIG. 3), as described below, extends through. The asymmetric opening 216 defines a circular portion 217, a widened portion 220, and a narrowed portion 222 extending between the circular portion 217 and the widened portion 220. The narrowed portion 222 defines a cam surface 222a. As shown in FIG. 2, the widened portion 220 and the narrowed portion 222 are located at a location of the asymmetric opening 216 proximate the top wall 208. However, it should be appreciated that the widened portion 220 and the narrowed portion 222 may be located at any point radially around the asymmetric opening 216 of the first side wall 212.

In some embodiments, the second side wall 214 includes an asymmetric opening 218 that mirrors the asymmetric opening 216 of the first side wall 212. The asymmetric opening 218 defines a circular portion 219, a widened portion 221, and a narrowed portion 223 extending between the circular portion 219 and the widened portion 221. The narrowed portion 223 defines a cam surface 223a.

Referring now to FIG. 3, an exploded perspective view of the receiving member 230 and the pin 242 of the tow hook assembly 200 are depicted. The receiving member 230 includes a leading portion 240, a first arm 232a extending from the leading portion 240, and a second arm 232b extending from the leading portion 240 opposite the first arm 232a. In embodiments, the receiving member 230 is a shackle. The leading portion 240 extends between the first arm 232a and the second arm 232b in a forward vehicle longitudinal direction. A receiving opening 235 is defined between the leading portion 240, the first arm 232a, and the second arm 232b. An opening 234a, 234b is formed in the first arm 232a and the second arm 232b, respectively. The openings 234a, 234b each define a slot 236a, 236b formed therein extending radially out from a circumference of the openings 234a, 234b.

The receiving member 230 may be of any suitable shape or size such that a tow strap 500 may attach to the receiving member 230. The tow strap 500 may be received within the receiving opening 235. In embodiments, the tow strap 500 may include a strap portion 502 and a connection portion 504 extending from the strap portion 502. The connection portion 504 connects to or otherwise engages the receiving member 230, specifically, the leading portion 240 of the receiving member 230.

The pin 242 generally has a cylindrical shape with a first pin end 241 and a second pin end 243 opposite the first pin end 241. The pin 242 has a length extending between the first pin end 241 and the second pin end 243. The length of the pin 242 is greater than a width of the receiving member 230 extending between an outer surface of the first arm 232a proximate the opening 234a and an outer surface of the second arm 232b proximate the opening 234b. Accordingly, the first pin end 241 and the second pin end 243 protrude outwardly from the openings 234a, 234b formed in the first arm 232a and the second arm 232b, respectively, when positioned within the receiving member 230.

The pin 242 has an extended portion 244 that runs along at least a portion of the length of the pin 242 along a longitudinal direction of the pin 242 between the first pin end 241 and the second pin end 243. In embodiments, the extended portion 244 of the pin 242 is formed of a second material having a second stiffness less than the first stiffness of the first material forming the first side wall 212 of the housing 202. A cross-section of the pin 242 including the extended portion 244 corresponds to a shape of the openings 234a, 234b formed in the first arm 232a and the second arm 232b to be retained, such as by a press fit, welding, or the like, when the pin 242 is inserted through the openings 234a, 234b. In some embodiments, only one of either the first side wall 212 or the second side wall 214 include the asymmetric opening 216, 218. As such, in some embodiments, the second side wall 214 includes the asymmetric opening 218 and the first side wall 212 does not include the asymmetric opening 216. In these embodiments, the first side wall 212 or the second side wall 214 that does not include the asymmetric opening 216, 218, include a symmetrical circular opening.

As such, the receiving member 230 and the pin 242 rotate with one another when contact is made with the leading portion 240 of the receiving member 230, as discussed in more detail herein. In embodiments, the extended portion 244 of the pin 242 extends along the entire length of the pin 242 in the vehicle lateral direction. In other embodiments, the extended portion 244 extends only partially along the length of the pin 242 in the vehicle lateral direction. For example, in embodiments, the extended portion 244 may not be formed along a portion of the length of the pin 242 between an inner surface of the first arm 232a and an inner surface the second arm 232b when the pin 242 is engaged with the receiving member 230. Rather, the extended portion 244 may be formed along a portion of the length of the pin 242 extending through the openings 234a, 234b of the first arm 232a and the second arm 232b, respectively, and outwardly therefrom along the pin 242.

Referring now to FIG. 4, a side view of the tow hook assembly 200 is illustrated in an assembled state and fixed below the front bumper 108, specifically, a cross member such as a bumper reinforcement 112 of the front bumper 108. The bumper reinforcement 112 includes a top wall 270, a bottom wall 274 opposite the top wall 270, a rear wall 268, and a front wall 272 opposite the rear wall 268. In embodiments, the tow hook assembly 200 is coupled to the vehicle 100 by a connector member 260. In embodiments, the connector member 260 extends upward in the vehicle vertical direction between the rear wall 268 of the front bumper 108 and a crush box 254 coupled to a vehicle frame 251 of the vehicle 100. The term "vehicle frame" may refer to any supporting structure of the vehicle 100 to which other components are attached. Moreover, the term "crush box" may refer to an energy absorbing device installed onto the vehicle frame 251 in order to reduce the impact force exhibited during vehicle collisions, such as a front end collision to the front bumper 108. The crush box 254 may include a central support section 255 having a first end 256 and a second end 252 opposite the first end 256. The central support section 255 extends in the vehicle longitudinal direction. The second end 252 of the central support section 255 of the crush box 254 is connected to the vehicle frame 251. In some embodiments, the central support section 255 of the crush box 254 may be hollow.

The connector member 260 includes a central body 261, a distal portion 262 and a proximal portion 263. The proximal portion 263 of the connector member 260 extends in a perpendicular direction from the central body 261 of the connector member 260 to form a general L shape. The proximal portion 263 is coupled to the top wall 270 of the bumper reinforcement 112 by one or more fasteners 258. However, it is understood that any number of fasteners 258 may be used to secure the proximal portion 263 to the front bumper 108. The fasteners 258 may be bolts, clips, welds, or the like. In other embodiments, the connector member 260 may be coupled to the vehicle 100 in any suitable method. For example, the connector member 260 may be coupled to the crush box 254, the vehicle frame 251, and/or the bumper reinforcement 112 of the front bumper 108. In embodiments, the first end 256 of the crush box 254 is connected to the central body 261 of the connector member 260. In other embodiments, the connector member 260 may have an aperture formed in the central body 261 so that the first end 256 of the crush box 254 may be connected to the rear wall 268 of the bumper reinforcement 112. In other embodiments, the connector member 260 may be integrally formed formed as a one-piece, monolithic structure with the crush box 254.

The tow hook assembly 200 is coupled to connector member 260 by coupling the rear wall 210 of the housing 202 to the distal portion 262 of the connector member 260. Accordingly, the rear wall 210 of the housing 202 is coupled to the connector member 260 below the front bumper 108 and the crush box 254 of the vehicle 100 in the vehicle vertical direction. In embodiments, a fastener 266 may extend through the pair of apertures 206 formed in the rear wall 210 of the housing 202, as shown in FIG. 2, and through the distal portion 262 of the connector member 260 to couple the housing 202 to the vehicle 100 below the bottom wall 274 of the front bumper 108. The fasteners 266 may be bolts, pins, welds, or the like.

In embodiments, any number of fasteners 266 may be used to couple the housing 202 to the distal portion 262 of the connector member 260. In some embodiments, the top wall 208 of the housing 202 may be coupled to the bottom wall 274 of the bumper reinforcement 112. A fastener 259 may extend through the pair of apertures 204 formed in the top wall 208 of the housing 202, as shown in FIG. 2, and through the bottom wall 274 of the bumper reinforcement 112 to further couple the tow hook assembly 200 to the vehicle 100. The fasteners 259 may be bolts, pins, welds, or the like. In embodiments, any number of fasteners 259 may be used to couple the housing 202 to the bottom wall 274 of the bumper reinforcement 112. It should also be understood that in some embodiments the housing 202 may be coupled to the bumper reinforcement 112 and not coupled to the connector member 260. In other embodiments, the housing 202 may be coupled to the crush box 254 and/or the vehicle frame 251.

Figure 5:
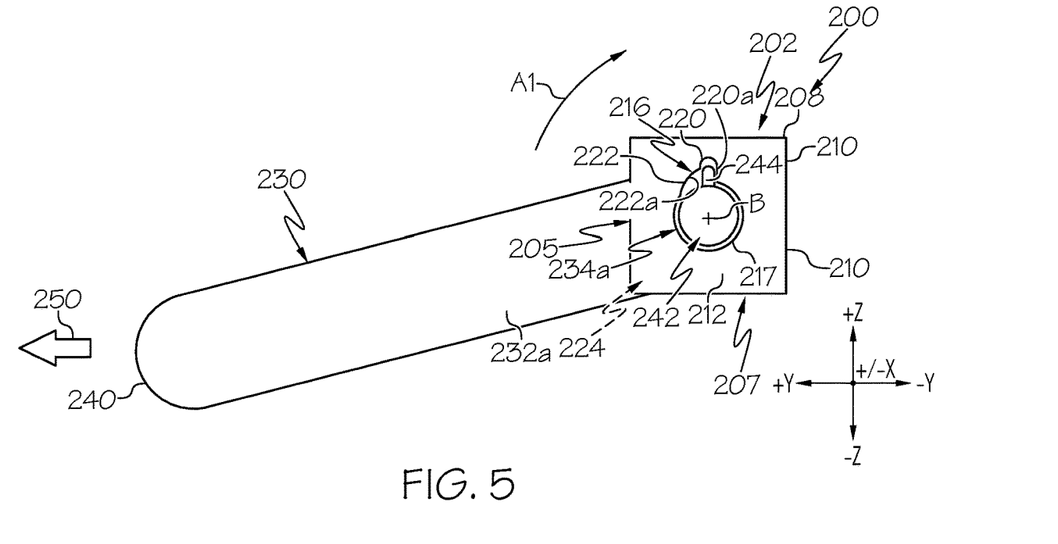
FIG. 5 schematically depicts a side view of the tow hook assembly of FIG. 4 in an extended position, according to one or more embodiments shown and described herein.

Referring now to FIG. 5 a side view of the tow hook assembly 200 in the assembled state is depicted. With more particularity, in the assembled state, the first arm 232a and the second arm 232b of the receiving member 230 extend into the open interior 224 of the housing 202 with the leading portion 240 of the receiving member 230 extending out from the housing 202. Although only the first side wall 212 is shown in FIG. 5, it should be appreciated that the pin 242, with the extended portion 244, extends through the asymmetric openings 216, 218 formed in the first side wall 212 and the second side wall 214 of the housing 202 and the openings 234a, 234b formed in the first arm 232a and the second arm 232b of the receiving member 230, respectively, to rotatably fix the receiving member 230 to the housing 202 and to permit the receiving member 230 to pivot about an axis B extending in the vehicle lateral direction. The pin 242 is secured to the housing 202 by positioning the extended portion 244 of the pin 242 into the widened portion 220 of the asymmetric opening 216 of the first side wall 212 and the widened portion 221 of the asymmetric opening 218 of the second side wall 214.

In the extended position, as seen in FIG. 5, the leading portion 240 of the receiving member 230 extends substantially in the vehicle longitudinal direction to be in a first vertical position. The extended portion 244 of the pin 242 is positioned through the widened portion 220 of the asymmetric opening 216 such that the receiving member 230 is secured in the extended position. It should be appreciated that when a force is applied in a towing direction of arrow 250, such as when the vehicle 100 is being towed or the vehicle 100 is towing another object, the extended portion 244 abuts against the end walls 220a, 221a of the widened portions 220, 221 to inhibit rotation of the pin 242 and the receiving member 230 in the direction of arrow A1.

Figure 6:
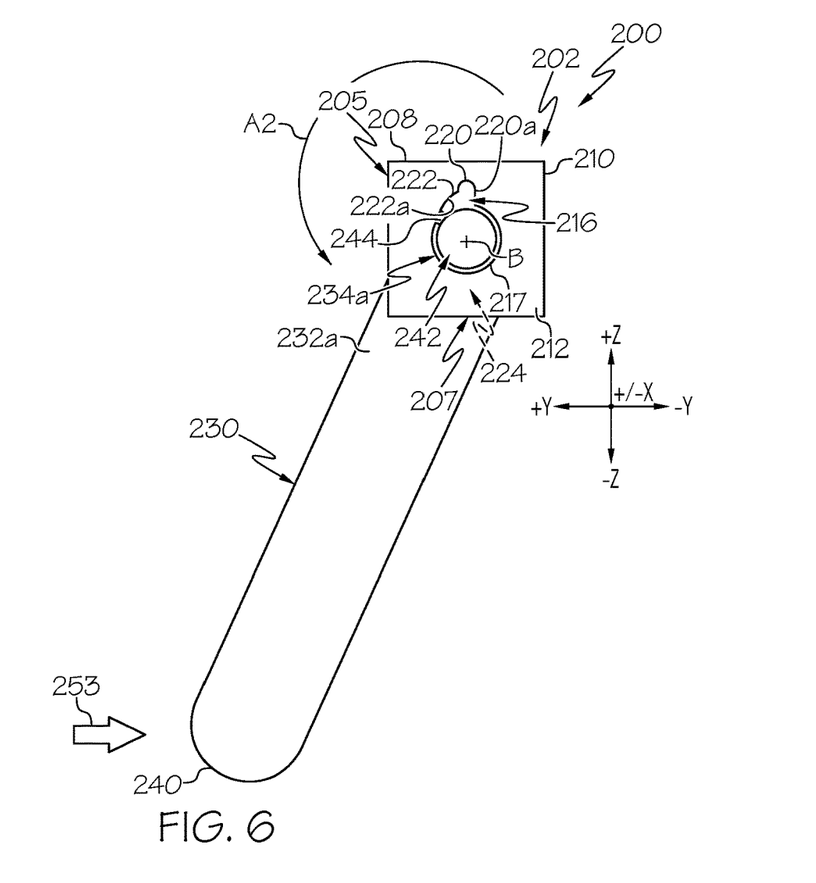
FIG. 6 schematically depicts a side view of the tow hook assembly of FIG. 4 in a rotated position, according to one or more embodiments shown and described herein.

Referring now FIG. 6, in the rotated position, the receiving member 230 is rotated in the direction of arrow A2 such that the leading portion 240 is at a second vertical position. The second vertical position is below the first vertical position in the vehicle vertical direction. It should be appreciated that the cam surfaces 222a, 223a of the narrowed portions 222, 223 of the asymmetric openings 216, 218 are tapered from the widened portion 220, 221, to the circular portions 217, 219 to inhibit the pin 242 from rotating in the direction of arrow A2 until a force exceeding a threshold is applied as depicted by arrow 253. However, the receiving member 230 rotates in the direction of arrow A2 when a force exceeding a threshold is applied against the leading portion 240 in the direction of arrow 253, the cam surfaces 222a,223a causing the extended portion 244 to deform. In embodiments the predetermined threshold force is 10 kN (kilonewton) ±1%, ±5%, ±10%, ±15%, ±25%, ±50%, ±75%.

In use, upon application of a force that exceeds a predetermined threshold in the direction of arrow 253 in FIG. 6 in a rearward vehicle longitudinal direction, the receiving member 230 rotates from the extended position with the leading portion 240 in the first vertical position, as shown in FIG. 5, to the rotated position with the leading portion 240 in the second vertical position, as shown in FIG. 6. As discussed herein, the end walls 220a, 221a of the widened portions 220, 221 inhibits rotation of the pin 242 in the direction of arrow A1 when in the extended position and a force is applied in the direction of arrow 250. Upon a force exceeding the predetermined threshold being applied in the direction of arrow 253 against the leading portion 240 of the receiving member 230, the extended portion 224 abuts against the cam surfaces 222a, 223a of the narrowed portions 222, 223 to deform the extended portion 224 which permits rotation of the pin 242 and the receiving member 230 in the direction of arrow A2. In some embodiments, the side walls 212, 214 are formed from a first material having a first stiffness greater than the second stiffness of the second material forming the extended portion 244, the extended portion 244 deforms upon a force exceeding the predetermined threshold being applied against the leading portion 240 in the direction of arrow 253 causing the receiving member 230 to pivot from the extended position to the retracted position in the direction A2.

Figure 7:
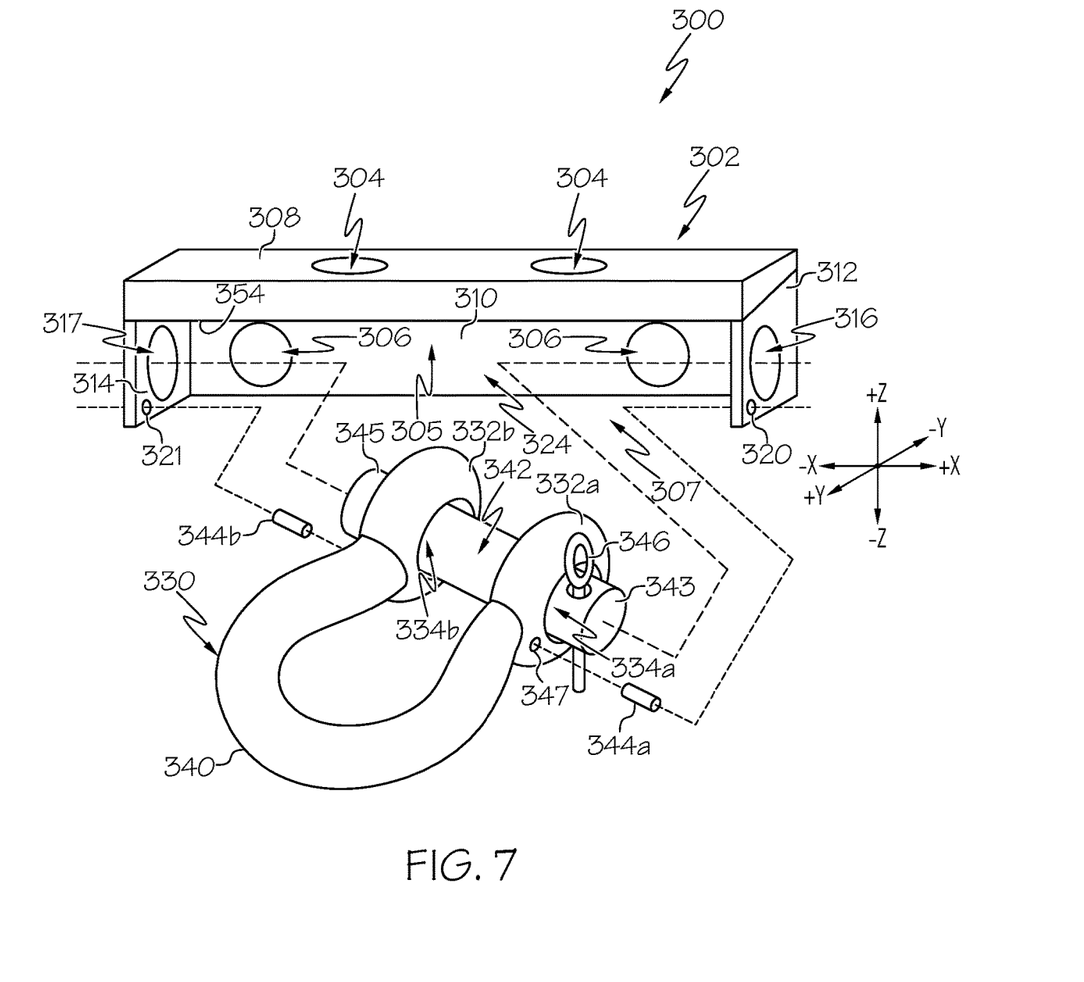
FIG. 7 schematically depicts an exploded view of another tow hook assembly including a frangible member, according to one or more embodiments shown and described herein.

Referring now to FIG. 7, an exploded view of an embodiment of a tow hook assembly 300 including a housing 302, a receiving member 330, a pin 342, and one or more frangible members 344a, 344b is depicted. The housing 302 includes a top wall 308 having a lower surface 354, a rear wall 310, a first side wall 312, and a second side wall 314 opposite the first side wall 312. The first side wall 312 and the second side wall 314 are formed of a first material having a first stiffness. The top wall 308, the rear wall 310, the first side wall 312, and the second side wall 314 cooperate to define an open interior 324.

The housing 302 also defines an open front portion 305 located between the first side wall 312 and the second side wall 314, adjacent to the top wall 308 and opposite the rear wall 310. The housing 302 further defines an open bottom portion 307 located between the first side wall 312 and the second side wall 314 and adjacent to the rear wall 310 and opposite the top wall 308. In embodiments, the top wall 308 tapers from open front portion 305 to the rear wall 310. As such, a thickness of the top wall 308 extending in the vehicle vertical direction is greater at the open front portion 305 than a thickness of the top wall 308 at the rear wall 310.

In embodiments, one or more apertures 304 are formed in the top wall 308 of the housing 302 through which a fastener 259 (FIG. 4) may extend to couple the top wall 308 of the housing 302 to bottom wall 274 of the bumper reinforcement 112 of the vehicle 100 (FIG. 1), similar to the manner in which the housing 202 is coupled to the front bumper 108 as shown in FIG. 4 and described herein. In embodiments, one or more apertures 306 may be formed in the rear wall 310 through which a fastener 266 (FIG. 4) may extend through to secure the housing 302 to the vehicle 100 (FIG. 1), similar to the manner in which the housing 202 is coupled to the connector member 260 as shown in FIG. 4 and described herein.

A first opening 316 is formed in the first side wall 312 of the housing 302 and a first opening 317 is formed in the second side wall 314 of the housing 302 through which a cylindrical pin 342, as described below, may extend therethrough. A second opening 320 is formed in the first side wall 312 through which a first frangible member 344a such as a first shear pin, as described below, at least partially extends. In embodiments, a second opening 321 is formed in the second side wall 314 through which a second frangible member 344b such as a second shear pin, as described below, at least partially extends. In some embodiments, only one of the first side wall 312 and the second side wall 314 may include the second opening 320, 321. The first frangible member 344a and the second frangible member 344b are formed of a second material having a second stiffness less than the first stiffness of the first material forming the first side wall 312 and the second side wall 314.

The receiving member 330 includes a leading portion 340, a first arm 332a extending from the leading portion 340 and a second arm 332b extending from the leading portion 340 opposite the first arm 332a. In embodiments, the receiving member 330 is a shackle. The leading portion 340 extends between the first arm 332a and the second arm 332b and in a forward vehicle longitudinal direction. An opening 334a, 334b is formed in each of the first arm 332a and the second arm 332b. Each opening 334a, 334b is shaped to allow the pin 342 to extend through the first arm 332a and the second arm 332b. In embodiments, the first arm 332a of the receiving member 330 also includes the first frangible member 344a positionable into the second opening 320 of the first side wall 312. In embodiments, the first frangible member 344a may be a pin, an extrusion, or other member designed to break away from the second opening 320 in the first side wall 312 upon a force exceeding a threshold applied to the receiving member 330. In embodiments, the first frangible member 344a may be positioned within an opening 347 formed in the first arm 332a of the receiving member 330. In other embodiments, the first frangible member 344a may be integrally formed as a one-piece, monolithic structure with the first arm 332a. Similarly, in some embodiments, the second arm 332b may include the second frangible member 344b either positioned within an opening formed in the second arm 332b, not shown, or formed as a one-piece, monolithic structure with the second arm 332b. The second frangible member 344b is positionable within the second opening 321 of the second side wall 314. Further, the location of the first frangible member 344a and the second frangible member 344b on the first arm 332a and the second arm 332b, respectively, may be at any suitable location so long as the position corresponds to a location of the second opening 320 of the first side wall 312 and the second opening 321 of second side wall 314, respectively.

As shown in FIG. 7, the pin 342 extends through the opening 334a of the first arm 332a and the opening 334b of the second arm 332b. The pin 342 includes a first end portion 343 and a second end portion 345 opposite the first end portion 343. The pin 342 has a shape that permits the receiving member 330 to rotate around the pin 342. In embodiments, a locking member 346 extends through the pin 342 proximate the first end portion 343 to prevent the pin 342 from moving in the vehicle lateral direction when the pin 342 is either coupled to the receiving member 330 or a second locking member 346 is located proximate the second end portion 345 of the pin 342. The first end portion 343 of the pin 342 extends through the first opening 316 of the first side wall 312. The first end portion 343 of the pin 342 extends through the first opening 316 of the first side wall 312 and the second end portion 345 of the pin 342 extends through the first opening 317 of the second side wall 314. In embodiments, a second locking member, similar to locking member 346, extends through the pin 342 proximate the second end portion 345.

Figure 8:
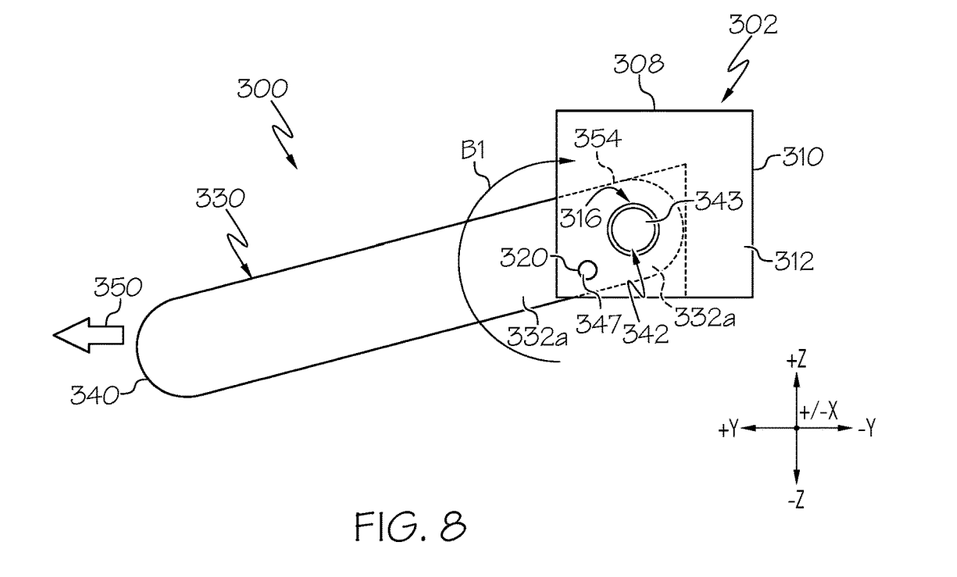
FIG. 8 schematically depicts a side view of the tow hook assembly of FIG. 7 in an extended position, according to one or more embodiments shown and described herein.
Figure 9:
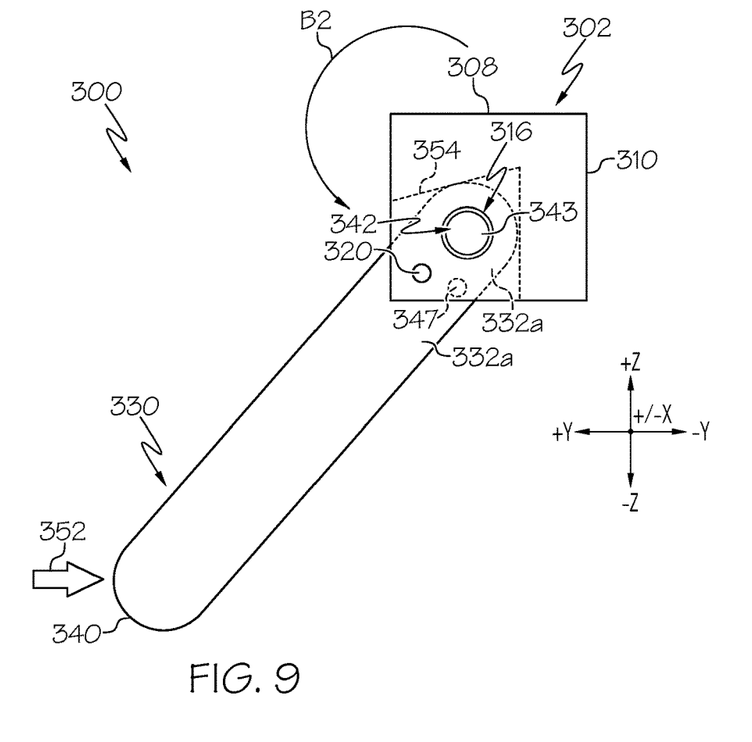
FIG. 9 schematically depicts a side view of the tow hook assembly of FIG. 7 in a rotated position, according to one or more embodiments shown and described herein.

Referring now to FIGS. 8 and 9, side views of the tow hook assembly 300 in the extended position and rotated position, respectively, are depicted. As shown, the pin 342 extends through the first arm 332a of the receiving member 330 and the first opening 316 formed in the first side wall 312 of the housing 302 to couple the first arm 332a of the receiving member 330 to the housing 302. In embodiments, although not shown, the same is applicable to the pin 342 extending through the second arm 332b of the receiving member 330 and the first opening 317 formed in the second side wall 314 of the housing 302.

In the extended position, as shown in FIG. 8, the first frangible member 344a is positioned within the second opening 320 formed in the first side wall 312 of the housing 302. The first frangible member 344a maintains the receiving member 330 in the extended position at a first vertical position. Although not shown, it should be appreciated that the second frangible member 344b extends through the second opening 321 formed in the second side wall 314 and assists in maintaining the receiving member 330 in the extended position. In some embodiments, the first frangible member 344a prohibits rotation of the receiving member 330 relative to the housing 302 until a force exceeding a predetermined threshold is applied to the receiving member 330. In embodiments the predetermined threshold force is 10 kN (kilonewton) ±1%, ±5%, ±10%, ±15%, ±25%, ±50%, ±75%. In the extended position, the leading portion 340 of the receiving member 330 extends substantially in the vehicle longitudinal direction at the first vertical position. Further, the receiving member 330 abuts against the lower surface 354 of the top wall 308 of the housing 302 when in the extended position. Accordingly, when a force is applied in the direction of arrow 350, such as when the vehicle 100 is being towed or the vehicle 100 is towing another object, the abutment of the lower surface 354 of the top wall 308 and the receiving member 330 inhibits rotation of the receiving member 330 in the direction of arrow B1. As such, a shear force is not applied to the first frangible member 344a and second frangible member 344b.

In the rotated position, as shown in FIG. 9, the receiving member 330 is rotated downward in the direction of arrow B2. As such, the leading portion 340 is positioned at a second vertical position. The second vertical position is lower than the first vertical position in the vehicle vertical direction. In the rotated position, the first frangible member 344a is broken, sheared away from the second opening 320 formed in the first side wall 312. In some embodiments, the second frangible member 244b is broken and shears away from the second opening 321 formed in the second side wall 314.

In use, upon the application of a force exceeding a threshold in the direction of arrow 352 of FIG. 9, the receiving member 330 rotates from the extended position to the rotated position in the direction of arrow B2. In doing so, the first frangible member 344a, which initially extends through the second opening 320 formed in the first side wall 312 when in the extended position, breaks to permit the receiving member 330 to rotate in the direction of arrow B1.

Figure 10:
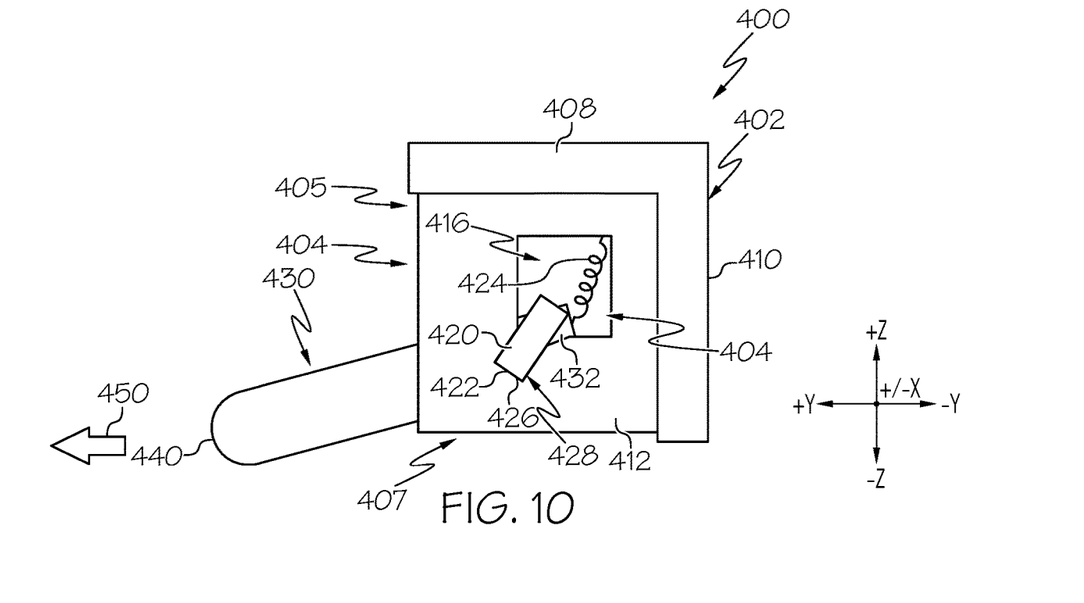
FIG. 10 schematically depicts a side view of another tow hook assembly in an extended position, according to one or more embodiments shown and described herein.
Figure 11:
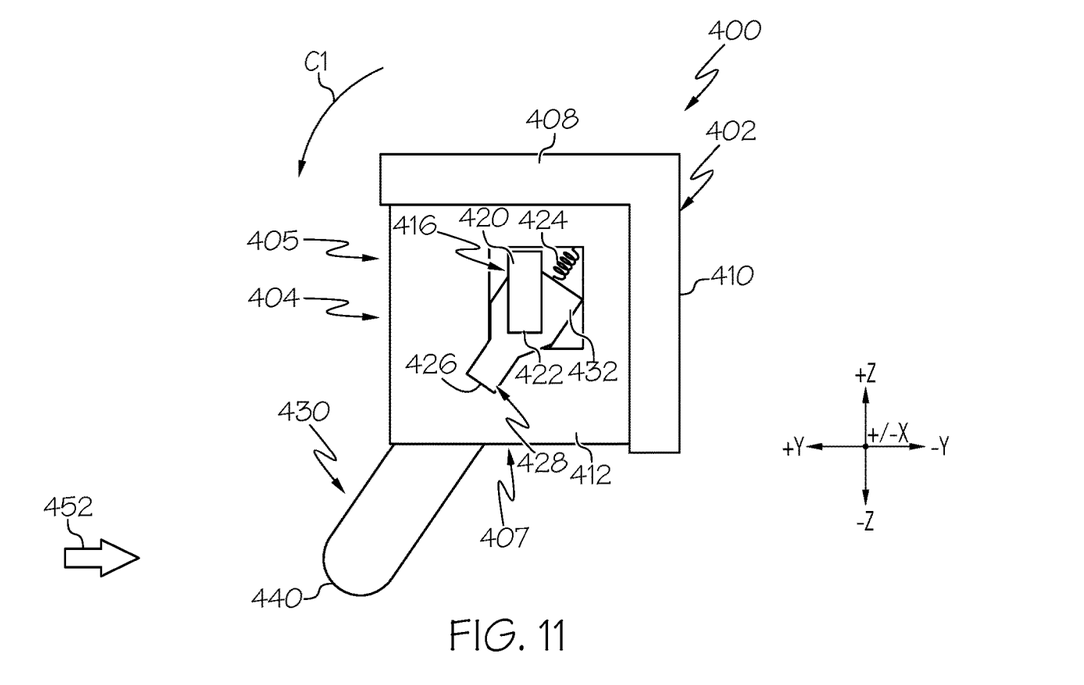
FIG. 11 schematically depicts a side view of the tow hook assembly of FIG. 10 in a rotated position, according to one or more embodiments shown and described herein.

Referring now to FIGS. 10 and 11, side views of yet another embodiment of a tow hook assembly 400 in an extended position and a rotated position, respectively, are depicted. In embodiments, the tow hook assembly 400 includes a housing 402 including a pair of side walls 412 (only one of which is shown), a top wall 408 opposite an open bottom portion 407 extending between the pair of side walls 412, and a rear wall 410 opposite an open front portion 405 and extending between the pair of side walls 412 and the top wall 408. The pair of side walls 412, the top wall 408, and the rear wall 410 cooperate to define an open interior 404. An opening 416 is formed in side wall 412 and defines a keyway 428 having a receiving surface 426.

The tow hook assembly 400 includes a receiving member 430, similar to the receiving members 230, 330, including a pair of arms 432 (only one of which is shown) opposite a leading portion 440. In embodiments, the pair of arms 432 of the embodiment include a key 420 having a shape corresponding to a shape of the keyway 428 of the opening 416. It should be understood that only one of the pair of arms 432 may include a key 420. The key 420 includes an end surface 422 that is received within the keyway 428 and abuts against the receiving surface 426 of the keyway 428 when in the extended position. The key 420 may be press fit within the keyway 428 to cause the receiving member 430 to be removably coupled to the housing 402 of the tow hook assembly 400.

In some embodiments, the tow hook assembly 400 further includes a biasing member 424 provided within the opening 416 to bias the key 420 of the receiving member 430 into the keyway 428 of the housing 402. In embodiments, the biasing member 424 extends from the key 420 of the receiving member 430 to the housing 402. In embodiments, the biasing member 424 is a spring. Accordingly, the biasing member 424 applies a biasing for against the receiving member 430 to hold the receiving member 430 in place within the keyway 428. In the extended position, as shown in FIG. 10, the leading portion 440 of the receiving member 430 extends of the housing 402 in a substantially longitudinal position in the vehicle longitudinal direction to be at a first vertical position. Additionally, the biasing member 424 is in a biased state to force the key 420 into the keyway 428. In the rotated position, as shown in FIG. 11, the receiving member 430 is pivoted downward in the direction arrow C1 in the vehicle vertical direction such that the leading portion 440 is positioned at a second vertical position lower than the first vertical position in the vehicle vertical direction. In the rotated position, the key 420 is moved to a position outside of the keyway 428 and the biasing member 424 is in a compressed state.

Upon the application of a force in the direction of arrow 450 being applied against the leading portion 440, as shown in FIG. 10, such as when the vehicle 100 (FIG. 1) is being towed or towing another object, the key 420 will be maintained within the keyway 428. However, upon the application of a force exceeding a first threshold being applied against the leading portion 440 of the tow hook assembly 400 in the direction of arrow 452 in the vehicle longitudinal direction, as shown in FIG. 11, the receiving member 430 rotates from the extended position to the rotated position. In embodiments, the first threshold force may be 1 kN (kilonewton) ±1%, ±5%, ±10%, ±15%, ±25%, ±50%, ±75%. Accordingly, the key 420 moves from a position fit into the keyway 428 into a position outside the keyway 428 and in the opening 416 of the side wall 412 to allow the receiving member 430 to pivot such that the leading portion 440 of the receiving member 430 is in the second vertical position lower than the first vertical position. The biasing member 424 compresses upon the application of the force exceeding the first threshold. In embodiments, when the force exceeding the first threshold is no longer applied to the leading portion 440 of the tow hook assemblies 400, the biasing member 424 returns to the extended position to force the key 420 into the keyway 428. In embodiments, upon a force exceeding a second threshold being applied against the leading portion 440 in the direction of arrow 452 in the vehicle longitudinal direction, the crush box 254 (FIG. 4) may compresses to absorb an impact and reduce damage to various components of the vehicle 100. In embodiments, the second threshold force exceeds 10 kN (kilonewton) ±1%, ±5%, ±10%, ±15%, ±25%, ±50%, ±75%. In embodiments, the first threshold is 5%, 10,%, 25%, 50%, or 75% of the second threshold ±1%, ±5%, ±10%, ±15%, ±25%, ±50%, ±75%.

From the above, it is to be appreciated that defined herein are embodiments of tow hook assemblies including a housing and a receiving member positioned within the housing such that the receiving member rotates in response to a force exceeding a threshold being applied against the receiving member in a rearward vehicle longitudinal direction. Permitting the tow hook assemblies described herein to rotate reduces the potential damage to other components of the vehicle when the vehicle is being towed or when a front end impact is received.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tow hook assembly comprising:
 a housing including a side wall defining an asymmetric opening having a cam surface and an end wall;
 a receiving member; and
 a pin rotatably coupling the receiving member to the housing for movement between an extended position and a rotated position, the pin including an extended portion received within the asymmetric opening of the housing, in the extended position the extended portion abuts against the end wall to inhibit rotation of the receiving member with respect to the housing in a first direction,
 upon application of a force exceeding a predetermined threshold on the receiving member, the extended portion abuts and deforms against the cam surface to permit rotation of the receiving member in a second direction opposite the first direction to rotate the receiving member from the extended position towards the rotated position.

2. The tow hook assembly of claim 1, wherein a portion of the housing defining the asymmetric opening is formed from a first material having a first stiffness and the extended portion of the pin is formed from a second material having a second stiffness, the first stiffness is greater than the second stiffness.

3. The tow hook assembly of claim 1, wherein the receiving member includes a pair of arms, an opening formed in an end of each arm of the pair of arms, the pin extending through the opening of each arm.

4. The tow hook assembly of claim 3, wherein the opening formed in each arm defines a slot, the extended portion of the pin received within the slot of the opening formed in each arm of the receiving member to rotatably fix the pin relative to the receiving member.

5. The tow hook assembly of claim 3, wherein the housing is fixed to a bottom surface of a bumper reinforcement.

6. The tow hook assembly of claim 3, wherein the housing further includes a second side wall defining an asymmetric opening having a cam surface and an end wall.

7. The tow hook assembly of claim 6, wherein the receiving member includes a leading portion provided between the pair of arms in a vehicle lateral direction, the leading portion located at a first vertical position when the receiving member is in the extended position and at a second vertical position when the receiving member is in the rotated position, the second vertical position being lower than the first vertical position in a vehicle vertical direction.

8. A tow hook assembly comprising:
 a housing having a side wall defining a first opening;
 a receiving member;
 a pin rotatably coupling the receiving member to the housing to rotate in a first direction from an extended position to a rotated position; and a frangible member moveable between an engaged position and a disengaged position, wherein in the engaged position, the frangible member couples the receiving member to the housing to inhibit rotation of receiving member from the extended position towards the rotated position, wherein in the disengaged position, the frangible member permits rotation of the receiver from the extend position towards the rotated position, wherein upon application of a force exceeding a predetermined threshold on the receiving member, the frangible member moves from the engaged position to the disengaged position.

9. The tow hook assembly of claim 8, wherein the receiving member includes a pair of arms, an opening formed in an end of each arm of the pair of arms, the pin extending through the opening of each arm.

10. The tow hook assembly of claim 9, wherein the housing is fixed to a bottom wall of a bumper reinforcement.

11. The tow hook assembly of claim 10, wherein the housing includes a top wall having a tapered lower surface.

12. The tow hook assembly of claim 11, wherein the tapered lower surface inhibits rotation of the receiving member in a second direction opposite the first direction when the receiving member is in the extended position.

13. The tow hook assembly of claim 11, wherein the receiving member includes a leading portion provided between the pair of arms in a vehicle lateral direction, the leading portion located at a first vertical position when the receiving member is in the extended position and at a second vertical position when the receiving member is in the rotated position, the second vertical position being lower than the first vertical position in a vehicle vertical direction.

14. The tow hook assembly of claim 8, wherein the receiving member and the side wall of the housing is formed from a first material having a first stiffness and the frangible member is formed from a second material having a second stiffness, the first stiffness is greater than the second stiffness.

15. A tow hook assembly comprising:
a housing having a side wall defining an opening and a keyway formed in the opening; and
a receiving member including a pair of arms and a key provided at an end of at least one of the arms, the receiving member moveable between an extended position and a rotated position, the key received within the keyway when the receiving member is in the extended position, the key removed from the keyway when the receiving member is in the rotated position.

16. The tow hook assembly of claim 15, further comprising a biasing member provided within the opening to bias the key of the receiving member into the keyway of the housing.

17. The tow hook assembly of claim 16, wherein the biasing member is a spring extending from the key of the receiving member to a portion of the side wall of the housing opposite the keyway.

18. The tow hook assembly of claim 15, wherein the key of the receiving member extends through the opening formed in the housing to retain the receiving member within the housing.

19. The tow hook assembly of claim 15, wherein the housing is fixed to a bottom surface of a front bumper.

20. The tow hook assembly of claim 19, wherein the receiving member includes a leading portion provided between the pair of arms in a vehicle lateral direction, the leading portion located at a first vertical position when the receiving member is in the extended position and at a second vertical position when the receiving member is in the rotated position, the second vertical position being lower than the first vertical position in a vehicle vertical direction.

* * * * *

UNITED STATES PATENT AND TRADEMARK OFFICE
CERTIFICATE OF CORRECTION

| | | |
|---|---|---|
| PATENT NO. | : 12,472,785 B2 | Page 1 of 1 |
| APPLICATION NO. | : 17/986404 | |
| DATED | : November 18, 2025 | |
| INVENTOR(S) | : Jeremiah T. Hammer | |

It is certified that error appears in the above-identified patent and that said Letters Patent is hereby corrected as shown below:

On the Title Page

Item (73), assignee 2, city, delete "Toyota (JP)" and insert --Toyota-shi Aichi-ken (JP)--, therefor.

In the Specification

In Column 1, Line(s) 58, after "rotation of", insert --the--.

In Column 6, Line(s) 25 & 26, delete "formed formed" and insert --formed--, therefor.

In Column 7, Line(s) 41, delete "222a,223a" and insert --222a, 223a--, therefor.

In Column 11, Line(s) 2, delete "for" and insert --force--, therefor.

Signed and Sealed this
Thirtieth Day of December, 2025

John A. Squires
*Director of the United States Patent and Trademark Office*